US009583223B2

(12) United States Patent
Pearson et al.

(10) Patent No.: US 9,583,223 B2
(45) Date of Patent: Feb. 28, 2017

(54) NUCLEAR REACTOR CORE LOADING AND OPERATION STRATEGIES

(75) Inventors: Gregory J. Pearson, Wilmington, NC (US); Atul A. Karve, Wilmington, NC (US)

(73) Assignee: Global Nuclear Fuel—Americas LLC, Wilmington, VA (US)

( * ) Notice: Subject to any disclaimer, the term of this patent is extended or adjusted under 35 U.S.C. 154(b) by 1189 days.

(21) Appl. No.: 13/531,514

(22) Filed: Jun. 23, 2012

(65) Prior Publication Data

US 2013/0343502 A1 Dec. 26, 2013

(51) Int. Cl.
*G21C 19/00* (2006.01)
*G21C 3/326* (2006.01)
*G21C 19/20* (2006.01)

(52) U.S. Cl.
CPC ........... *G21C 3/326* (2013.01); *G21C 19/205* (2013.01); *Y02E 30/38* (2013.01)

(58) Field of Classification Search
USPC ................................................ 376/267, 264
See application file for complete search history.

(56) References Cited

U.S. PATENT DOCUMENTS

| | | | |
|---|---|---|---|
| 3,385,758 A * | 5/1968 | Gyorey et al. | ................ 376/237 |
| 4,285,769 A | 8/1981 | Specker | |
| 4,378,329 A | 3/1983 | Uchikawa | |
| 5,631,939 A | 5/1997 | Haraguchi et al. | |
| 5,787,139 A | 7/1998 | Nakamura et al. | |
| 6,141,396 A | 10/2000 | Kanda et al. | |
| 6,504,889 B1 | 1/2003 | Narita et al. | |
| 2007/0002998 A1 | 1/2007 | Helmersson | |

FOREIGN PATENT DOCUMENTS

| | | |
|---|---|---|
| JP | 06-186372 | 7/1994 |
| JP | 06186372 A | 7/1994 |
| JP | 2000338281 A | 12/2000 |

(Continued)

OTHER PUBLICATIONS

Specker et al., Control Cell Core Improved Design, Trans. Am. Nucl. Soc. 30, 1978, Section 3, Appendix.

(Continued)

*Primary Examiner* — Jack W Keith
*Assistant Examiner* — Sharon M Davis
(74) *Attorney, Agent, or Firm* — Ryan Alley IP

(57) ABSTRACT

Cores include different types of control cells in different numbers and positions. A periphery of the core just inside the perimeter may have higher reactivity fuel in outer control cells, and lower reactivity cells may be placed in an inner core inside the inner ring. Cores can include about half fresh fuel positioned in higher proportions in the inner ring and away from inner control cells. Cores are compatible with multiple core control cell setups, including BWRs, ESBWRs, ABWRs, etc. Cores can be loaded during conventional outages. Cores can be operated with control elements in only the inner ring control cells for reactivity adjustment. Control elements in outer control cells need be moved only at sequence exchanges. Near end of cycle, reactivity in the core may be controlled with inner control cells alone, and control elements in outer control cells can be fully withdrawn.

20 Claims, 4 Drawing Sheets

(56) References Cited

FOREIGN PATENT DOCUMENTS

| JP | 3907133 B2 | 4/2007 |
|---|---|---|
| JP | 2008-145286 | 6/2008 |
| JP | 2011064568 A | 3/2011 |
| WO | 98/41991 | 9/1998 |

OTHER PUBLICATIONS

Dag et al., Westinghouse new BWR fuel—towards the flawless target, Proceedings of 2010 LWR Fuel Performance/TopFuel/WRFPM, 2010, Orlando.
Wheeler et al., Application of OPTIMA2 Fuel to Reduce Shadow-Corrosion Induced Channel Distortion in Low Hot Excess Reactivity BWR Core Designs, Proceedings of 2010 LWR Fuel Performance/TopFuel/WRFPM, 2010, Orlando.
Unofficial English translation of ES Office Action issued Apr. 29, 2014 in connection with corresponding ES Patent Application No. 201330766.
Unofficial English translation of Swedish Office Action issued in connection with corresponding SE Application No. 1350723-1 on Oct. 13, 2014.
Unofficial translation of Japanese Office Action in corresponding application JP2013-130101, Jan. 29, 2015.

* cited by examiner

- Fresh, High-Enrichment Fuel Bundle
- Fresh, Low-Enrichment Fuel Bundle
- Burnt Fuel Bundle
- Controlled Bundles

NUCLEAR REACTOR CORE LOADING AND OPERATION STRATEGIES

BACKGROUND

FIG. 1 is an illustration of several related art nuclear fuel bundles 10 and core components commonly encountered in existing nuclear power technology. As shown in FIG. 1, one or more fuel bundles 10 containing several individual fuel rods may be placed within a reactor core in conventional fuel placement strategies. A channel 20 may surround the fuel rods in each bundle 10, providing directed coolant and/or moderator flow within bundles 10 and/or facilitating manipulation of bundles 10 as a single rigid body. Control rods or cruciform control blades 60 may be extended from set core locations between bundles to absorb neutrons and control reactivity and ultimately control reactivity by a degree of insertion or withdrawal from between the fuel bundles 10. Fuel support 70 may support and align bundles 10 at constant positions within the core.

FIG. 2 is a quadrant map of a related art Boiling Water Reactor (BWR) core, illustrating fuel bundle locations within one quarter of the core. Reactor cores typically are conveniently symmetrical about at least two perpendicular axes, such that a quadrant map of FIG. 2 conveys the makeup of the entire core. As shown in FIG. 2, individual bundle locations are occupied by fresh (shown with diagonal or cross-hatched fill) or burnt (shown with no fill) fuel bundles at the start of a fuel cycle, before commencement of power operations in the core. Fresh bundles are bundles that have not previously been exposed to neutron flux during power operations, i.e., never been burnt, whereas burnt fuel bundles have received such exposure, typically over one or more fuel cycles lasting 1-2 years. As such, burnt fuel bundles typically have exposure, or burnup, of several GWd/ST.

Fresh fuel bundles may have different starting enrichments of fissile material content. For example, in some BWR designs, outer-enrichment bundles (shown in cross-hatched fill) may include approximately 4.3% Uranium-235 fuel, and inner-enrichment bundles (shown in diagonal fill) may include approximately 4.2% Uranium-235 fuel. Varying enrichments, such as the one shown in FIG. 2, may permit a flatter radial power profile in the core and/or achieve other operational effects. Further, in some BWR designs, bundles may also possess varying distributions and concentrations of burnable poisons/neutron absorbers to suppress reactivity and optimize operational characteristics. As shown in FIG. 2, at startup related art nuclear fuel cores include an outer peripheral ring of stale fuel bundles surrounding an inner peripheral ring of fresh, high-enrichment fuel bundles. A central region may include 50% or more fresh bundles in order to maximize fresh fuel content over an even distribution, permitting longer operating cycles with lower downtime.

In related art BWRs, cruciform control blades 60 extend centrally between groupings of four fuel bundles in order to absorb neutrons and control the nuclear chain reaction in the core. As shown in FIG. 2, the groupings of four fuel bundles, between which control blades extend, are identified in bolded outline as controlled bundles, or control cells. Bundles within the controlled bundle groups conventionally have one face closest to a control blade used during the fuel cycle; such bundles are referred to as controlled bundles and their positions as controlled positions in control cells of four bundles. Different control blades in different control cells, usually four or five per quadrant, are conventionally alternately inserted and withdrawn in different and complex control blade sequences in order to manage reactivity and power distribution and spread control blade usage across several different blades and fresh fuel bundles within the core.

As shown in FIG. 2, in order to maximize the number of fresh fuel bundles used in a longer cycle over an even core distribution, several fresh fuel bundles may be placed in controlled positions adjacent to operated control blades within the inner portion of the core. Due to conventional operation of control blades, all fresh fuel bundles in the central core portion may be controlled—having direct exposure to control blades actively moved to finely control reactivity—throughout an entire fuel cycle. Use of fresh fuel bundles in controlled locations causes several problems, including corrosion and channel bowing that worsens in later cycles, and a need to perform complex and/or lower-power control blade sequence exchanges due to this positioning that worsen plant economics. Some related art fuel cores have avoided this problem by using a Control Cell Core loading strategy, where only burnt fuel bundles are placed closest to operated control blades, resulting in fewer fresh bundles used in the central portion of the core and shorter operating cycles.

SUMMARY

Example embodiments include nuclear cores with at least two control cell types that differ in total reactivity. The different control cell types may be placed in numbers and/or positions the enhance fuel and core performance. Example cores may include an outermost region with lower reactivity fuel bundles, an inner peripheral region lining the outer peripheral region and having higher reactivity fuel bundles and at least portions of the outermost control cells, and an inner core lining the inner peripheral region and having inner control cells with only fuel bundles of lower reactivity. The lower reactivity bundles may be burnt, and the higher reactivity bundles may be fresh, for example, the outer control cells can include two fresh fuel bundles and the inner control cells can include only burnt fuel bundles. However, reactivity differences may also be achieved through fuel enrichment variation, burnable poison presence, etc. In an example with a conventional BWR, the inner peripheral region may be three bundles thick, most of which can be higher reactivity fuel bundles, and the outer peripheral region may be three bundles thick. In this instance, there may be thirteen inner control cells. Example embodiments are not limited to BWRs or specific placements, but are compatible with any type of core control cell setup, including control cells formed with control rods or cruciform control blades having four fuel bundles positioned in each corner the blades. Different core geometries are easily outfitted with example embodiments; for example, in an ESBWR, the inner core region may have twenty-five inner control cells.

Example methods include creating and/or operating nuclear cores with multiple types of control cells. For example, a core may be loaded to form an example embodiment core. In example methods, control elements in only the inner control cells may be moved to control core reactivity, except at sequence exchanges after several weeks or months of operation, such as after 3 GWd/ST. At such a sequence exchange, a single coarse movement of control elements in the outer control cells may be made in order to resume controlling day-to-day reactivity with the inner control cells. Near the end of a cycle, when reactivity is lowest, reactivity in the core may be controlled only with inner control cells, and control elements in the outer control cells can be fully withdrawn.

Example embodiments and methods can provide high (approximately 50%) fresh fuel volumes for each cycle, enabling longer cycles and better plant economics. Example methods and embodiments further provide high power density and low leakage through segregating fuel types by reactivity in the periphery and inner portions of the core. Example methods and embodiments further may enable simplified and non-interrupting movement of control elements in the inner core to fully control reactivity without causing negative control element and fuel interactions.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
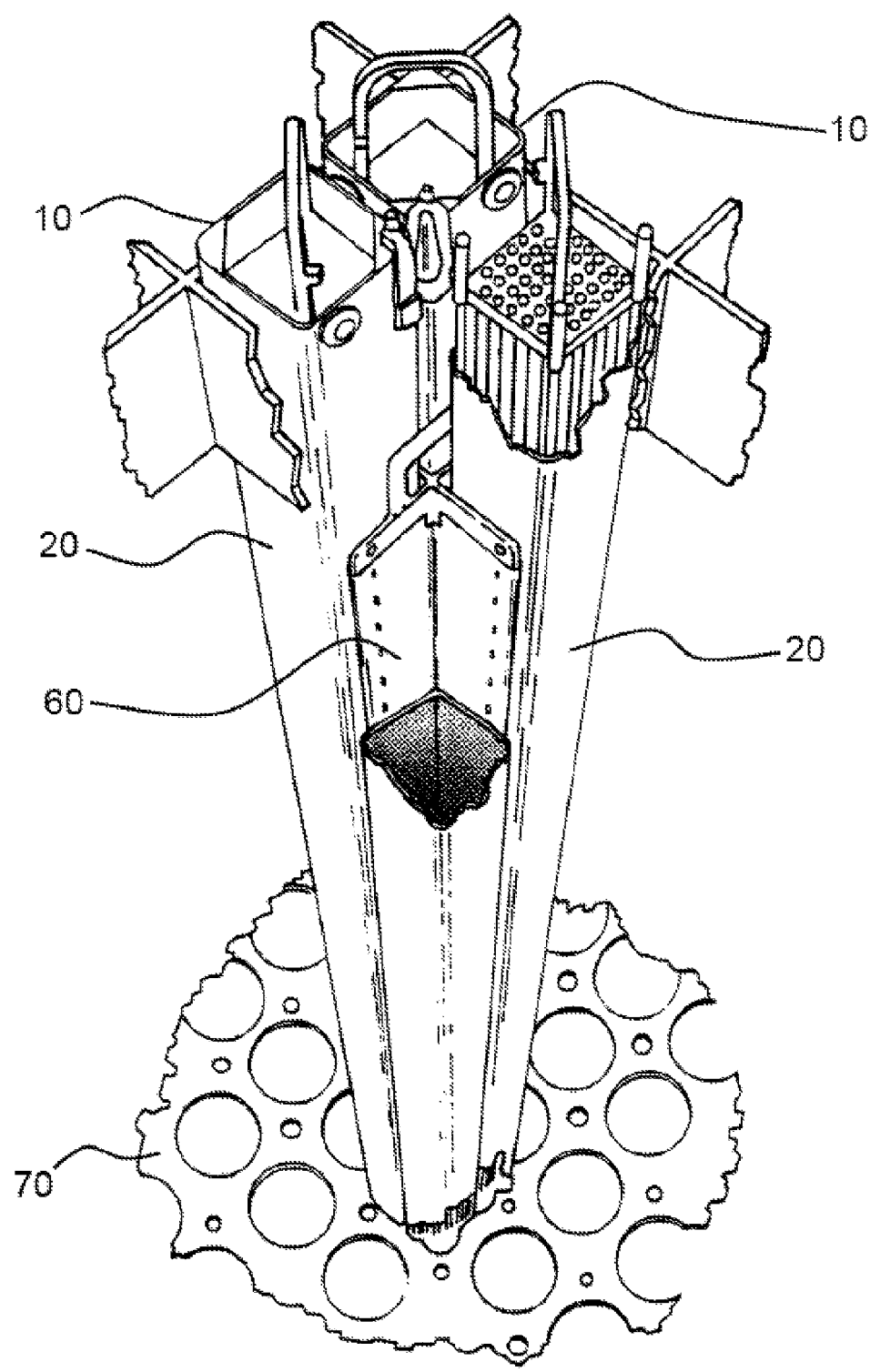
FIG. 1 is an illustration of related art fuel bundles loaded into a core having cruciform blades for control elements.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Applicants have recognized problems existing in several diverse types of nuclear fuel cores with control element placement near certain fuel bundles. Particularly, Applicants have identified that while a maximization of fresh fuel within a nuclear fuel core at any beginning of cycle will permit longer cycle operating times and reduce outage intervals, such maximization can also force fresh fuel bundles to be placed directly next to control elements, which may cause several problems over the life of the fuel, including corrosion, channel-blade interference, and pellet-cladding interactions. Applicants have further recognized that Control Cell Core management techniques, where fresh fuel bundles are not placed directly adjacent to control elements, restricts the amount of fresh fuel that can be placed within a core, as well as limiting placement of fresh fuel in optimal positions for power management, resulting in worsened burnup/efficiency and shorter operating cycles. Example embodiments and methods below uniquely address these and other problems identified by Applicants in related nuclear fuel management technologies for a diverse array of nuclear plants.

Example Embodiments

Example embodiments of the invention include nuclear fuel cores having higher reactivity fuel in lower proportions adjacent to control elements. Lower reactivity fuel is placed in greater proportions adjacent to control elements, while permitting overall fuel content and operating lifespan of the core to be substantially maintained. Example embodiments form two or more different types of positions subject to direct control element exposure—a larger number of controlled positions of a first type having a higher population of burnt and/or lower-enrichment fuel; and a smaller number of controlled positions of a second type having a higher population of fresh and/or higher-enrichment fuel. Specific example embodiments describing how this configuration may be achieved across several different core designs are discussed below, with the understanding that specific placements of the differing types of controlled positions within various regions in example embodiments can be varied based on core design and reactivity needs. It is further understood that any specific plant type, fuel type, enrichment level, exposure level, and/or control element configuration discussed in these example embodiments are not limiting but merely examples of the breadth of nuclear reactor technologies across which example embodiments may be implemented. Example methods of forming and using example embodiments are described thereafter.

Figure 2:
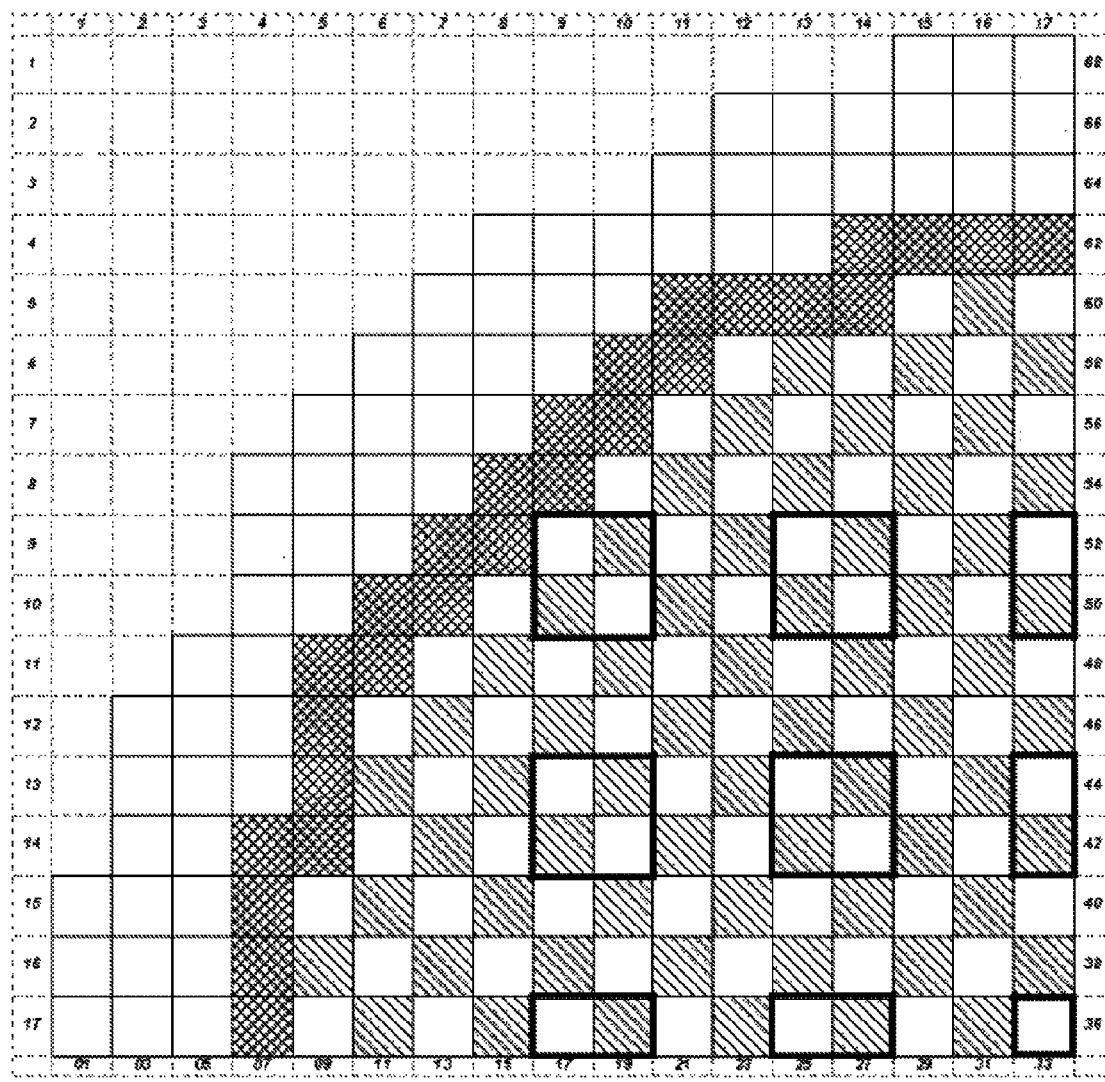
FIG. 2 is a quadrant map of a related art commercial nuclear reactor core.
Figure 3:
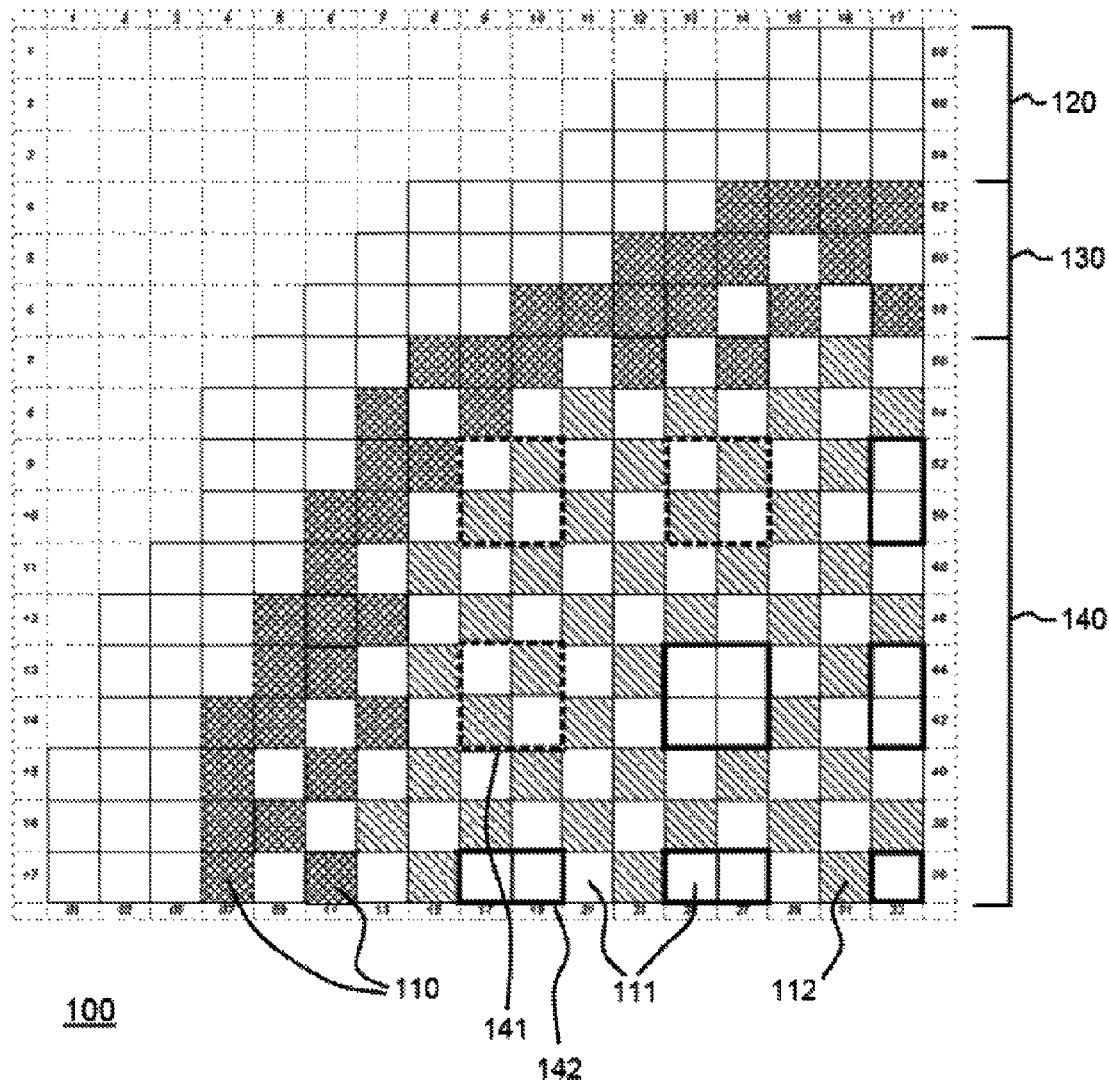
FIG. 3 is a quadrant map of an example embodiment nuclear core.

FIG. 3 is a quadrant map of an example embodiment fuel core 100; for example, FIG. 3 may be an initial loading map for a particular cycle. Core 100 may be useable in existing boiling water reactors; for example, core 100 may be useable in similar plants as the related fuel core loading strategy of FIG. 2. As shown in FIG. 3, core 100 may include a typical BWR fuel core geometry, such as a 17-bundle radius quadrant.

Example embodiment core 100 can be visualized in three regions: an outer periphery 120; an inner periphery 130; and an inner core 140. Outer periphery 120 may be up to three fuel bundles thick from an edge of the core in a reactor and include mostly burnt fuel bundles 111 (no fill). Burnt fuel bundles 111 are bundles that have experienced burnup in previous operating cycles or otherwise have been exposed to neutron flux or have significantly lower reactivity than fresh fuel bundles.

Inner periphery 130 may be up to three fuel bundles thick and include a larger proportion of higher enrichment fresh fuel bundles 110 (cross-hatched fill). Inner core 140 includes the remainder of the core within inner periphery 130 and includes a mix of lower enrichment fresh fuel bundles 112 (diagonal fill) and burnt fuel bundles 111. Fresh fuel bundles 110 and 112 may have little or no previous neutron flux exposure compared to burnt fuel bundles 111. For example, fresh fuel bundles 110 and 112 may be newly-manufactured bundles previously unused in core operations. Higher enrichment fresh fuel bundles 110 and lower enrichment fresh fuel bundles 112 may differ in fissile material enrichment by any degree required for core 100 operations and optimization. For example, higher enrichment fresh fuel bundles 110 may contain 4.3% Uranium-235 fuel, and lower enrichment fresh fuel bundles 112 may include approximately 4.2% Uranium-235 fuel. Fuel bundles 110 and 112 may each have distinct distributions and concentrations of burnable absorber as well.

In other example embodiments, burnt fuel bundles 111, higher enrichment fresh fuel bundles 110, and lower enrichment fresh fuel bundles 112 may be replaced with fuel bundles having a same age but varying initial enrichment and burnable absorber concentration in order to achieve the same reactivity differences as between bundles 110, 111, and 112 in example embodiment core 100. Similarly, reactivity differences may be achieved by using bundles of a same initial enrichment but having three different operating exposure levels, such as fresh, burnt 1-cycle, or burnt 2-cycles in place of higher enrichment fresh fuel bundles 110, lower enrichment fresh fuel bundles 112, and burnt fuel bundles 111. Yet further, reactivity and enrichment differences between all fresh fuel bundles 110 and 112 may be non-existent or minimal, such as where a single fuel type and enrichment is used throughout an entire example core having only differently-aged fuel bundles.

Comparing FIGS. 2 and 3, it can be seen that example embodiment core 100 includes more fresh fuel bundles in inner periphery region 130 and does not adhere to a strict checkerboard pattern for fresh and stale fuel bundles in inner core 140. In this way, example embodiment core 100 may include substantially the same amount of fresh fuel bundles 110 and 112 and/or fissile mass and reactivity as related art cores loaded for maximum operation cycle length. Instead of a strict checkerboard alteration between burnt fuel bundles 111 and lower enrichment fresh bundles 112 in inner core 140, example embodiment core 100 includes some groupings of fuel bundles that include more burnt bundles 111. As seen in FIG. 3, four burnt fuel bundles 111 may be grouped about a control blade so as to form a priority control cell 142 that includes less fresh fuel bundles than non-priority control cells 141. For example, as shown in FIG. 3, priority control cells 142, shown by a solid black line surrounding bundle locations so controlled, may include only burnt fuel bundles 111. Priority control cells 142 may be inner-most control cells within inner region 140. Non-priority control cells 141, shown by a broken black line surrounding bundle locations so controlled, may include a mix of burnt fuel bundles 111 and fresh bundles 112 similar to related art core of FIG. 1 and may be positioned closer to or in inner periphery 130, outside of priority control cells 142.

Figure 4:
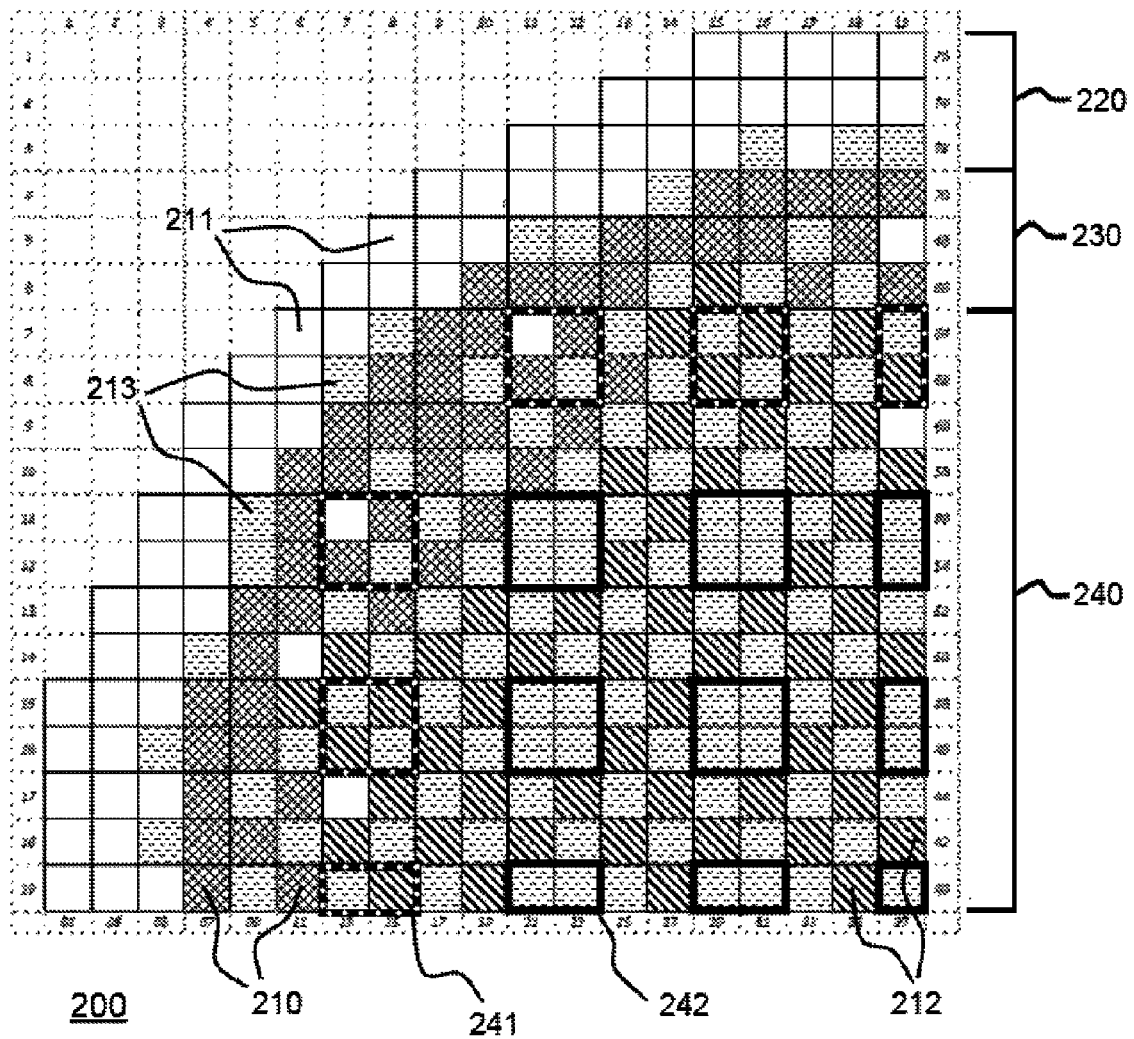
FIG. 4 is a quadrant map of another example embodiment nuclear core.

FIG. 4 is a quadrant map of an example embodiment fuel core 200; for example, FIG. 4 may be an initial loading map for a particular cycle. Core 200 in the example of FIG. 4 may be useable in an Economic Simplified Boiling Water Reactor (ESBWR). As shown in FIG. 4, core 200 may include a typical ESBWR fuel core geometry, such as a 19-bundle radius quadrant.

Example embodiment core 200 can be visualized in three regions: an outer periphery 220; an inner periphery 230; and an inner core 240. Outer periphery 220 may be up to three fuel bundles thick from an edge of the core in a reactor and include mostly once-burnt fuel bundles 213 (dashed fill) and twice-burnt fuel bundles 211 (no fill). Burnt fuel bundles 211 and 213 are bundles that have experienced burnup in previous operating cycles or otherwise have been exposed to neutron flux or have significantly lower reactivity than fresh fuel bundles. For example, once-burnt fuel bundles 213 have approximately 15-23 GWd/ST exposure from a single two-year operating cycle in known ESBWR cores, and twice-burnt fuel bundles 211 may have more burnup, such as 35-40 GWd/ST exposure.

Inner periphery 230 may be one to three fuel bundles thick and include a larger proportion of higher enrichment fresh fuel bundles 210 (cross-hatched fill). Inner core 240 includes the remainder of the core within inner periphery 230 and includes a mix of mostly lower enrichment fresh fuel bundles 212 (diagonal fill) and once-burnt fuel bundles 213. Fresh fuel bundles 210 and 212 may have little or no previous neutron flux exposure compared to burnt fuel bundles 211 and 213. For example, fresh fuel bundles 210 and 212 may be newly-manufactured bundles previously unused in core operations. Higher enrichment fresh fuel bundles 210 and lower enrichment fresh fuel bundles 212 may differ in fissile material enrichment by any degree required for core 200 operations and optimization. For example, higher enrichment fresh fuel bundles 210 may contain 4.3% Uranium-235 fuel, and lower enrichment fresh fuel bundles 212 may include approximately 4.2% Uranium-235 fuel. Fuel bundles 210 and 212 may each have distinct distributions and concentrations of burnable absorber as well.

In other example embodiments, twice-burnt fuel bundles 211, once-burnt fuel bundles 213, higher enrichment fresh fuel bundles 210, and lower enrichment fresh fuel bundles 212 may be replaced with fuel bundles having a same age but varying initial enrichment and burnable absorber concentration in order to achieve the same reactivity differences as between bundles 210, 211, 212, and 213 in example embodiment core 200. Similarly, reactivity differences may be achieved by using bundles of a same initial enrichment but having three different operating exposure levels, such as fresh, burnt 1-cycle, or burnt 2-cycles in place of higher enrichment fresh fuel bundles 210, lower enrichment fresh fuel bundles 212, and burnt fuel bundles 211 and 213. Yet further, reactivity and enrichment differences between fresh fuel bundles 210 and 212 may be non-existent or minimal, such as where a single fuel type and enrichment is used throughout an entire example core having only differently-aged fuel bundles.

Example embodiment core 200 may include substantially the same amount of fresh fuel bundles 210 and 212 and/or fissile mass as related art ESBWR cores loaded for maximum operation cycle length. Example embodiment core 200 includes some groupings of fuel bundles that include more burnt bundles 211 and/or 213. As seen in FIG. 4, four once-burnt fuel bundles 213 may be grouped about a control blade so as to form a priority control cell 242 that includes less fresh fuel and less reactivity than non-priority control cells 241. For example, as shown in FIG. 4, priority control cells 242, shown by a solid black line surrounding bundle locations so controlled, may include only once-burnt fuel bundles 213. Priority control cells 242 may be innermost control cells within inner region 240. Non-priority control cells 241, shown by a broken black line surrounding bundle locations so controlled, may include a mix of burnt fuel bundles 211 and 213 and fresh bundles 112 and may be positioned closer to or in inner periphery 230.

Example embodiment cores are useable with fuel assemblies described in co-owned application Ser. No. 12/843,037 filed Jul. 25, 2010 titled "OPTIMIZED FUEL ASSEMBLY CHANNELS AND METHODS OF CREATING THE SAME," which is incorporated herein by reference in its entirety. For example, fuel bundles that are to be placed in controlled positions in example embodiment cores may use channels with Zircaloy-4 to additionally guard against shadow corrosion.

Other example embodiment cores may be useable in Advanced Boiling Water Reactors, other Light and Heavy Water Reactors, or any nuclear reactor having nuclear chain reaction control structures extending into the core that are useable to control reactivity, with modifications of size and initial enrichments made for the appropriate type of core and control element placement.

Example Methods

Example methods include loading and/or operating nuclear cores. Example methods may take particular advantage of nuclear cores loaded as described above in example embodiments, but it is understood that example methods and embodiments may be used separately.

During an operating outage or other time when a core is available for loading, an operator or other party may load a core so as to achieve loading patterns consistent with those described in the above example embodiments. For example, existing fuel bundles may be shuffled into stale fuel positions based on their age, enrichment, and/or reactivity. Such shuffling may open a number of positions about an inner periphery and non-primary controlled locations within the inner core. A desired number of oldest or least functional fuel bundles may be removed from the core. Fresh fuel bundles may be procured and installed in locations vacated by the fuel shuffle, based on enrichment or other parameters. Such shuffling may create a fuel core resembling example embodiments described above or related embodiments.

During operation of a core, control elements may be used to control the nuclear chain reaction. For example, in related art BWRs, a cruciform control blade may be extended between four adjacent bundles in a control cell to control reactivity. Example methods include using only control elements directly adjacent to fuel bundles having relatively lower reactivity and/or being previously burnt and not fresh for fine, day-to-day reactivity control within a core. In example methods, control elements directly adjacent to fresh or higher reactivity fuel bundles are relatively stationary and used for only coarse reactivity adjustments at a few set points during the fuel cycle; these control elements may be entirely removed from the core—i.e., not used at all for reactivity control—during the later portions of the cycle.

As a specific example method in connection with the example embodiment of FIG. 4, an operator or other party may load an ESBWR core 200 so as to create priority control cells 242 including only burnt fuel associated with control blades in a central area of inner core 240 of core 200. Non-priority control cells 241 including some fresh and/or high-reactivity fuel bundles are created at control blade positions nearer or in the inner periphery region 230, outside of the priority control cells 242. During sequence exchange intervals occurring at approximately every 3 GWd/ST of operation, for example, control blades in non-priority cells 241 may be moved to a desired coarse reactivity control position. Otherwise, control blades in non-priority cells 241 are not required to be moved for reactivity control, and control blades only in priority control cells 242 may be moved for fine reactivity control throughout the sequence. During the final quarter of operation, at approximately 15 GWd/ST cycle average exposure, for example, control blades in non-priority cells 241 may be fully withdrawn and not necessary to control reactivity. At all points during the cycle, control blades associated with priority cells 242 may be freely moved to make fine adjustments to core reactivity. During the final quarter of the cycle, control blades in priority cells 242 alone may be used to control core reactivity; that is, control blades in priority cells 242 may be the only blades within core 200 after approximately 15 GWd/ST.

Example embodiments and/or methods may provide fuel cores in existing and future-designed reactors with large enough fresh fuel reload batch sizes to accommodate longer operating cycles with higher power densities, while reducing or eliminating concerns associated with placing fresh or higher reactivity fuel directly adjacent to control elements. Placement of fresh fuel in greater numbers about an inner periphery of the core and in limited number of controlled positions may provide a low-leakage core having several inner controlled positions not including fresh or high reactivity fuel. In this way, shadow corrosion, pellet-cladding interaction, and resulting channel distortions and negative control element-channel interaction may be reduced by avoiding placement of the newest and/or highest reactivity fuel bundles closest to active control elements. In addition to longer operating cycle compatibility, high power density, lower leakage, and reduced channel distortion, example embodiments and/or methods may permit nuclear fuel cores to be operated with simplified control element maneuvers; particularly, example embodiments and methods may permit only a subset of control elements to be used for immediate, fine reactivity control and reduce a number of total control element sequences and exchanges throughout an entire operating cycle and/or reduce any need to lower power during such complicated exchanges. These and other advantages and solutions to newly-identified core operating problems are addressed by the various example embodiments and methods described above.

Example embodiments and methods thus being described, it will be appreciated by one skilled in the art that example embodiments may be varied and substituted through routine experimentation while still falling within the scope of the following claims. For example, a variety of different nuclear fuel types and core designs are compatible with example embodiments and methods simply through loading and operational strategy—and without any core geometry or structural changes—and fall within the scope of the claims. Such variations are not to be regarded as departure from the scope of these claims.

What is claimed is:

1. A method of operating a nuclear core, the method comprising:
   loading an outer peripheral region extending from an edge of the core toward a center of the core with burnt fuel bundles;
   loading fuel bundles in a first type of control cell in an inner peripheral region extending from the outer peripheral region toward the center; and
   loading fuel bundles in a second type of control cell in an inner core region extending from the inner peripheral region toward the center, wherein,
      the first type and the second type of control cells include only fuel bundles positioned directly adjacent to moveable reactivity control elements, and
      the first type of control cell includes,
         a first fuel bundle having a reactivity that is substantially higher than a reactivity of each fuel bundle of the second type of control cell, and
         a second fuel bundle having a reactivity that is substantially equal to a fuel bundle of the second type of control cell.

2. The method of claim 1, further comprising:
   moving control elements in only the second type of control cell to control reactivity in the core for a plurality of operating days while control elements in the first type of control cell remain inserted in the core and stationary.

3. The method of claim 2, further comprising:
   withdrawing control elements in the first type of control cell only after approximately 3 GWd/ST.

4. The method of claim 1, further comprising:
   completely withdrawing control elements in only the first type of control cell during the final quarter of the operating cycle.

5. The method of claim 1, wherein the loading the inner periphery creates the first type of control cell including at least two fresh fuel bundles, and wherein the loading the inner core creates the second type of control cell including no fresh fuel bundles.

6. The method of claim 1, wherein the first type of control cell includes a plurality of the first fuel bundles, wherein the first fuel bundles are fresh fuel bundles having different fuel enrichments from each other.

7. The method of claim 1, further comprising:
   removing approximately half of all fuel bundles in the core before the loadings.

8. The method of claim 1, further comprising:
   loading the inner core region completely with fuel bundles, wherein adjacent fuel bundles not in the second type of control cell in the inner core region have substantially differing reactivities from each other.

9. The method of claim 8, further comprising:
   repeating the loading the outer peripheral region and the inner peripheral region until the core is full and so that the core includes more of the second type of control cells than the first type of control cells, wherein the first fuel bundle is a fresh fuel bundle, and wherein the second type of control cells includes no fresh fuel;
   fully withdrawing all control elements except those in the first and the second type of control cells from the core; and
   maintaining all control elements in the core in the first type of control cells while controlling reactivity in the core with only the control elements in the second type of control cells for a plurality of days.

10. The method of claim 8, wherein the first type of control cell is loaded with fuel bundles having a highest reactivity among all fuel bundles in the core.

11. The method of claim 1, wherein the first fuel bundle has a reactivity that is higher by equivalent of approximately 15 to approximately 23 GWd/ST exposure from the second bundle.

12. A method of operating a nuclear core having at least two different types of control cells, with a first type of control cell having a combined reactivity higher than a combined reactivity of the second type of control cell, and with more second type of control cells than the first type of control cells, wherein the first type of control cell includes a fuel bundle having a reactivity that is substantially equal to a fuel bundle of the second type of control cell, the method comprising:
   moving control elements in only the second type of control cell to control reactivity in the core while control elements in the first type of control cell remain inserted in the core and stationary for a plurality of operating days.

13. The method of claim 12, further comprising:
   withdrawing control elements in the first type of control cell only after approximately 3 GWd/ST.

14. The method of claim 12, further comprising:
   completely withdrawing control elements in only the first type of control cell during the final quarter of the operating cycle.

15. The method of claim 12, wherein there are a plurality of the first type of control cells, and wherein all of the first type of control cells are radially outside of the second type of control cells in the core.

16. The method of claim 15, wherein the core is filled with fuel assemblies surrounding the first and the second type of control cells, and wherein adjacent fuel bundles not in the second type of control cell and radially within the first type of control cells in the core have substantially differing reactivities from each other.

17. The method of claim 16, wherein the first type of control cells all include fresh fuel, and wherein the second type of control cells all include only burnt fuel.

18. The method of claim 12, further comprising:
   fully withdrawing all control elements from the core except for those in the first and the second type of control cells prior to the moving control elements in only the second type of control cell.

19. The method of claim 18, further comprising:
   partially withdrawing control elements in the first type of control cell only after approximately 3 GWd/ST; and
   fully withdrawing control elements in the first type of control cell from the core only during the final quarter of the operating cycle.

20. The method of claim 12, wherein the first type of control cells all include fresh fuel, and wherein the second type of control cells all include only burnt fuel.

* * * * *